United States Patent
Patton et al.

(10) Patent No.: US 9,954,849 B2
(45) Date of Patent: Apr. 24, 2018

(54) SYSTEMS AND METHODS FOR MANAGING SECURE SHARING OF ONLINE ADVERTISING DATA

(71) Applicant: AOL Advertising Inc., New York, NY (US)

(72) Inventors: Matthew M. Patton, Baltimore, MD (US); Seth Mitchell Demsey, Dulles, VA (US)

(73) Assignee: OATH (AMERICAS) INC., New York, NY (US)

( * ) Notice: Subject to any disclaimer, the term of this patent is extended or adjusted under 35 U.S.C. 154(b) by 126 days.

(21) Appl. No.: 14/751,960

(22) Filed: Jun. 26, 2015

(65) Prior Publication Data

US 2015/0381607 A1 Dec. 31, 2015

Related U.S. Application Data

(60) Provisional application No. 62/018,118, filed on Jun. 27, 2014.

(51) Int. Cl.
*H04L 9/32* (2006.01)
*H04L 29/06* (2006.01)
(Continued)

(52) U.S. Cl.
CPC .......... *H04L 63/0823* (2013.01); *G06F 21/10* (2013.01); *G06F 21/6245* (2013.01);
(Continued)

(58) Field of Classification Search
CPC ...... G06F 21/10; G06F 21/6245; G06F 21/33; G06F 21/335; G06F 2221/0771;
(Continued)

(56) References Cited

U.S. PATENT DOCUMENTS 8,468,608 B1 * 6/2013 Hernacki ................ G06F 21/10
726/1
2002/0112164 A1 8/2002 Schmeling et al.
(Continued)

FOREIGN PATENT DOCUMENTS

WO WO 2011/073894 A1 6/2011

OTHER PUBLICATIONS

European Patent Office Extended Search Report issued in corresponding European Application No. 15174279.8, dated Oct. 7, 2015.

*Primary Examiner* — Trong Nguyen
(74) *Attorney, Agent, or Firm* — Bookoff McAndrews, PLLC

(57) ABSTRACT

Systems and methods are disclosed for managing online advertising data secure sharing. One method includes receiving, at a server, a request for proprietary data from a data consumer, the request including a data consumer identifier; retrieving, from a database of proprietary data, proprietary data based on the request; determining, by the server, whether the retrieved proprietary data is at least one of: designated to be processed and designated to have privileges set; processing, by the server, the proprietary data when the server determines the proprietary data is designated to be processed; setting one or more privileges to the proprietary data using the certificate associated with the data consumer identifier when the server determines the proprietary data is designated to have privileges set; encrypting the proprietary data using the certificate associated with the data consumer identifier; and transmitting the encrypted proprietary data to the data consumer.

17 Claims, 4 Drawing Sheets

(51) Int. Cl.
  *G06F 21/10*   (2013.01)
  *G06F 21/62*   (2013.01)
  *G06Q 30/02*   (2012.01)
  *H04L 9/08*    (2006.01)

(52) U.S. Cl.
  CPC ......... *G06Q 30/0241* (2013.01); *H04L 9/088* (2013.01); *H04L 9/3263* (2013.01); *H04L 63/045* (2013.01); *H04L 63/102* (2013.01); *G06F 2221/0771* (2013.01); *G06F 2221/2137* (2013.01); *H04L 2209/603* (2013.01)

(58) Field of Classification Search
  CPC ............. G06F 2221/2137; H04L 9/088; H04L 2209/60; H04L 2209/603; H04L 63/0823; H04L 9/3263; H04L 63/0435; H04L 63/0442; H04L 63/045; H04L 63/102; G06Q 30/0241
  See application file for complete search history.

(56) References Cited

U.S. PATENT DOCUMENTS

| | | | |
|---|---|---|---|
| 2004/0039911 A1* | 2/2004 | Oka | G06Q 30/06 713/175 |
| 2004/0088541 A1* | 5/2004 | Messerges | G06F 21/10 713/156 |
| 2004/0139027 A1 | 7/2004 | Molaro | |
| 2005/0251694 A1* | 11/2005 | Ueda | H04M 3/487 713/193 |
| 2007/0033402 A1* | 2/2007 | Williams | G06Q 30/02 713/169 |
| 2011/0023124 A1* | 1/2011 | Selander | G06F 21/10 726/26 |
| 2012/0323750 A1 | 12/2012 | Sivaramakrishnan et al. | |

\* cited by examiner

SYSTEMS AND METHODS FOR MANAGING SECURE SHARING OF ONLINE ADVERTISING DATA

CROSS-REFERENCE TO RELATED APPLICATIONS

This application claims priority under 35 U.S.C. § 119(e) to U.S. Provisional Application No. 62/018,118, filed on Jun. 27, 2014, entitled "Systems and Methods for Managing Sharing of Online Advertising Data," and the contents of the foregoing application are incorporated herein by reference in their entirety.

TECHNICAL FIELD

Various embodiments of the present disclosure relate generally to securely controlling access to and use of online advertising data among computer systems over an electronic network. More specifically, particular embodiments of the present disclosure relate to systems and methods for managing secure sharing of online advertising data.

BACKGROUND

Companies, universities, governments, and other operators of network services own or generate proprietary data from various of their respective online systems. This proprietary data may include online advertising data and other forms of user data. Non-identifiable user data, which is user data that does not disclose the user from which the data is generated, is a valuable commodity in the online marketing field. This non-identifiable user data, however, is not easily traded or shared between the data owners (many of whom would like to sell or trade their proprietary data) and data consumers (many of whom would like to buy or trade the propriety data of data owners). Data owners may want to control the use of their proprietary data, and may want to ensure that the proprietary data is securely shared with data consumers. However, data owners have not been able to ensure the integrity of their proprietary data when shared under conventional methods and systems. Further, due to privacy concerns, a data owner may not be able to share their proprietary data because it may contain identifiable user data, to which the data owner may wish to restrict access. Traditionally, data owners have not been able to share their proprietary data in a way that ensures such information is securely shared among parties.

Accordingly, a need exists for systems and methods for managing proprietary data, such as online advertising data, and securely sharing such data in a secure manner. More specifically, a need exists for systems and methods for allowing a more liquid marketplace in the secure trading and secure sharing of online advertising data while preserving data integrity and adhering to industry privacy standards.

SUMMARY OF THE DISCLOSURE

According to certain embodiments, methods are disclosed for managing online advertising data secure sharing. One method includes: for managing online advertising data secure sharing, the method including: receiving, at a server, a request for proprietary data from a data consumer, the request including a data consumer identifier; retrieving, from a database of proprietary data, proprietary data based on the request; determining, by the server, whether the retrieved proprietary data is at least one of: designated to be processed and designated to have privileges set; processing, by the server, the proprietary data when the server determines the proprietary data is designated to be processed; setting one or more privileges to the proprietary data using the certificate associated with the data consumer identifier when the server determines the proprietary data is designated to have privileges set; encrypting the proprietary data using the certificate associated with the data consumer identifier; and transmitting the encrypted proprietary data to the data consumer.

According to certain embodiments, systems are disclosed for managing online advertising data secure sharing. One system includes a data storage device storing instructions for securely managing online advertising data sharing; and a processor configured to execute the instructions to perform a method managing online advertising data secure sharing, the method including: receiving a request for proprietary data from a data consumer, the request including a data consumer identifier; retrieving, from a database of proprietary data, proprietary data based on the request; determining whether the retrieved proprietary data is at least one of: designated to be processed and designated to have privileges set; processing the proprietary data when the server determines the proprietary data is designated to be processed; setting one or more privileges to the proprietary data using the certificate associated with the data consumer identifier when the server determines the proprietary data is designated to have privileges set; encrypting the proprietary data using the certificate associated with the data consumer identifier; and transmitting the encrypted proprietary data to the data consumer.

According to certain embodiments, non-transitory computer-readable media storing instructions that, when executed by a computer, cause the computer to perform a method for managing online advertising data secure sharing are disclosed. One computer-readable medium includes: receiving, at a server, a request for proprietary data from a data consumer, the request including a data consumer identifier; retrieving, from a database of proprietary data, proprietary data based on the request; determining, by the server, whether the retrieved proprietary data is at least one of: designated to be processed and designated to have privileges set; processing, by the server, the proprietary data when the server determines the proprietary data is designated to be processed; setting one or more privileges to the proprietary data using the certificate associated with the data consumer identifier when the server determines the proprietary data is designated to have privileges set; encrypting the proprietary data using the certificate associated with the data consumer identifier; and transmitting the encrypted proprietary data to the data consumer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
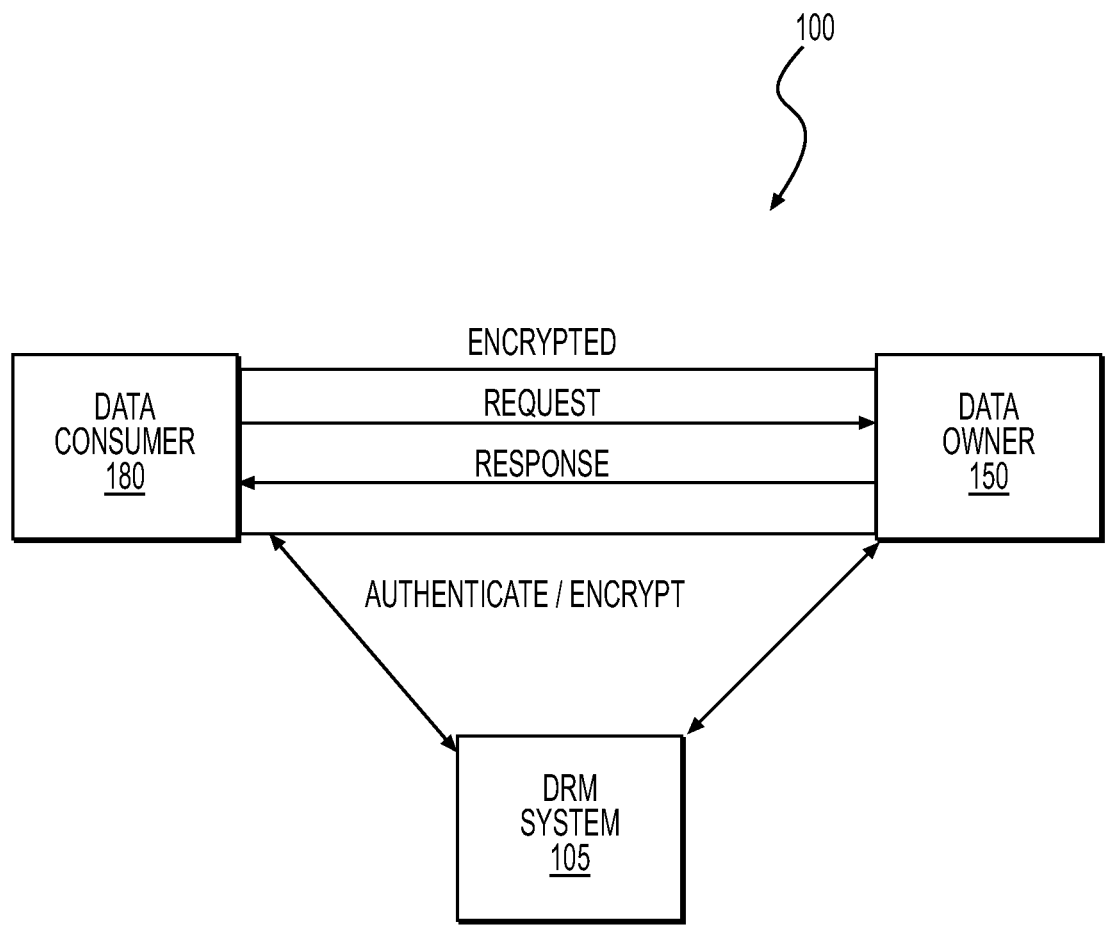
FIGS. 1A and 1B are diagrams of a system and environment in which data owners may manage proprietary data sharing with data consumers using a DRM system according to embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

In one embodiment of the disclosure, systems and methods are described that enable the creation and management of encryption and access rights to proprietary data, such as online advertising data. The proprietary data may be generated and/or stored by one or more data owners including data brokers, Internet advertisers, data management platform ("DMP") services, and/or any other industry that generates and/or stores proprietary data. These data owners acquire, generate, store, and/or use vast amounts of proprietary data that relates to users, such as Internet users who view and interact with online advertisements. The data owner may wish to sell, lease, and/or share its proprietary data with data consumers, which may include other data owners, data brokers, Internet advertisers, DMP services, and/or other industries that generate and/or store proprietary data.

A data consumer that may want to access the data of the data owner may be a reporting service. A reporting service may access the data owner's data for providing reports. For example, the reporting service may be a server-based reporting platform that provides comprehensive reporting functionality for a variety of data sources. The reporting service may create, manage, and deliver reports, and application program interfaces ("APIs") that allows customers and/or other data consumers to integrate and/or extend data of the data owner and report processing in custom applications.

A data consumer may also be an impression bidder that may want access to the data of the data owner in order to determine whether to buy an advertising space. An impression bidder may access the data owner's data to provide real-time decision making for matching a user to segment based for an advertisement. For example, with real-time bidding and real-time access to the data owner's data, an impression bidder may use the data owner's data and bid on an impression, which if the bid is accepted, the impression bidder's advertisement may be displayed to the user.

When a data consumer is a data management platform ("DMP") service, the DMP service may access the data owner's data to synchronize user related data of the DMP service with user related data of the data owner. After synchronization, the DMP service may use the data for reporting, decision making, and/or for marketing/advertising decisions.

In order to control access to the proprietary data, the systems and methods disclosed herein may allow data owners to restrict access to their proprietary data and/or to revoke access to their proprietary data remotely with or without communication with the data consumer. The systems and methods also may allow for the secure transmission of proprietary data from the data owner to the data consumer. These abilities may allow the data owner to retain control options, and allow the data owner to leverage the proprietary data in a "privacy-friendly" manner.

A data consumer that wishes to have access to the proprietary data may register with a digital rights management ("DRM") system. The DRM system may be a system operated by the data owner and/or a third party. The DRM system may be used by one or more data owners to authenticate the data consumer. The DRM system may be used to obtain a digital certificate for encryption and/or decryption of proprietary data and/or may be used to provide secure communication between the data consumer and the data owner. Through the use of a DRM system, a data owner may be able to maintain control of its proprietary data and securely encrypt the proprietary data to be transferred to the data consumer. In an embodiment of the present disclosure, the DRM system may use Public Key Infrastructure ("PKI") and may leverage a secure data transfer through an application programming interface ("API"). The DRM system may include an Extensible Markup Language ("XML") Key Management Specification ("XKMS") that allows for management of access to be stored centrally, and that allows for the encryption and/or decryption of data messages that are sent between the data owner and data consumer.

Once a data consumer has registered with the DRM system, the data consumer may send requests for proprietary data to the data owner using the digital certificate. As discussed below, the proprietary data requested may then be processed, encrypted, and/or packaged to control the access to the proprietary data. The data owner, through its server or through a connection to the DRM server, may process and encrypt the proprietary data. The data owner may then have the encrypted proprietary data sent to the data consumer and/or allow the data consumer to access the encrypted proprietary data through a web-interface and/or an application on a system of the data consumer.

The digital certificate provided by the DRM system may be set to include privilege rights that are associated with the proprietary data. The privilege rights may set restrictions on how the proprietary data may be used, such as for analytical purposes only, and may be set to allow the data consumer to only view the proprietary data. Other privileges may be set to, e.g., restrict how long access to the proprietary data is allowed. Additionally, the privilege rights may be set to have no restrictions to the proprietary data, if desired. When a data consumer makes a request for proprietary data to have no restrictions set, a data owner may send the requested proprietary data in encrypted form to the data consumer. The data consumer may then decrypt the proprietary data with the certificate from the DRM system, and may retain a copy of the proprietary data without any restrictions.

The data owner may provide various privileges to the DRM system for each of data consumer and for each of a data consumer's partner, such as customers and/or business associates of the data consumer. The data owner may add and/or remove any privileges from data consumers and their partners in real-time. Additionally, the data owner may set time-ranges for access to their proprietary data based one or more factors, such as a length of a data consumer's advertising campaign and/or any other parameters for automated privilege granting and removing.

The service and privilege rights may also be set to one or more of: restricting access time to the proprietary data; restricting the proprietary data type/format; restricting the proprietary data to only be aggregated and/or processed data; and/or revoking access to the data under predefined conditions.

One example of a service/privilege that may be set by the data owner through the DRM system may be to set aggregations for analytics when a data consumer is, for example, a reporting service. If the data consumer is a reporting service, the certificate with the proprietary data from the DRM system may have the access to the proprietary data limited to aggregate form. A data consumer may then have access to certain table and/or list of the data of the data owner.

When a data consumer is an impression bidder, the impression bidder may want access to the user related data of the data owner in order to determine whether to buy an advertising space for targeting advertisements. The user related data may provide more accuracy in determining whether to place a bid for an advertising space. Since the user related data may be more specific than aggregated data, access to the data of the data owner may be limited to one or more transactions and/or for a limited time period. For example, the data of the data owner may only be made available to the data consumer for a single transaction by setting the service and privilege rights of the digital certificate to work for a single transaction. Additionally, and/or alternatively, the service and privilege rights of the digital certificate may be set to revoke access to the data owner's data after a predetermined period of time.

If a data consumer's certificate allows for access to user related data for bidding and/or decision making, i.e., the data consumer is an impression bidder, then the data owner's certificate may include settings with targeting parameters to pass into data owner's system. The data owner may then transmit encrypted data to the data consumer that contains the targeting parameters requested by the data consumer. The encrypted data may then be decrypted when the DRM system receives the encrypted data from the data consumer and authentication and/or permission from the data owner to allow the decryption. A DRM system and/or the data owner may remove the privilege and/or additional access to the encrypted data.

When a data consumer is a data management platform ("DMP") service, the DMP service may access the data owner's data to synchronize user related data of the DMP service with user related data of the data owner. The DMP service may request to synchronize their user related data with the data of the data owner. The data owner may receive an encrypted set of data from the data owner. The encrypted data may then be decrypted when the DRM system receives the encrypted data from the DMP service, and authentication and/or permission from the data owner to allow the decryption.

For example, a DMP service may be able to synchronize their user related data with user related data of the data owner. The DMP service may be able to determine which of their users are matched with the users of the data owner. The DMP service may be able to access a hashed value for an audience segment or a generic category name (such as, device information and/or behavioral data) for a user from the data of data owner. When a DMP service attempts to share this data with another data consumer, the DMP service may synchronize their user related data with the data consumer. However, when the other data consumer attempts to access the user related data of the data owner, the DRM system may receive a request for permission to access the data of the data owner. The DRM system may then request authentication and/or permission from the data owner to allow the access. The data owner may then elect to permit or prevent access to the other data consumer.

Figure 1B:
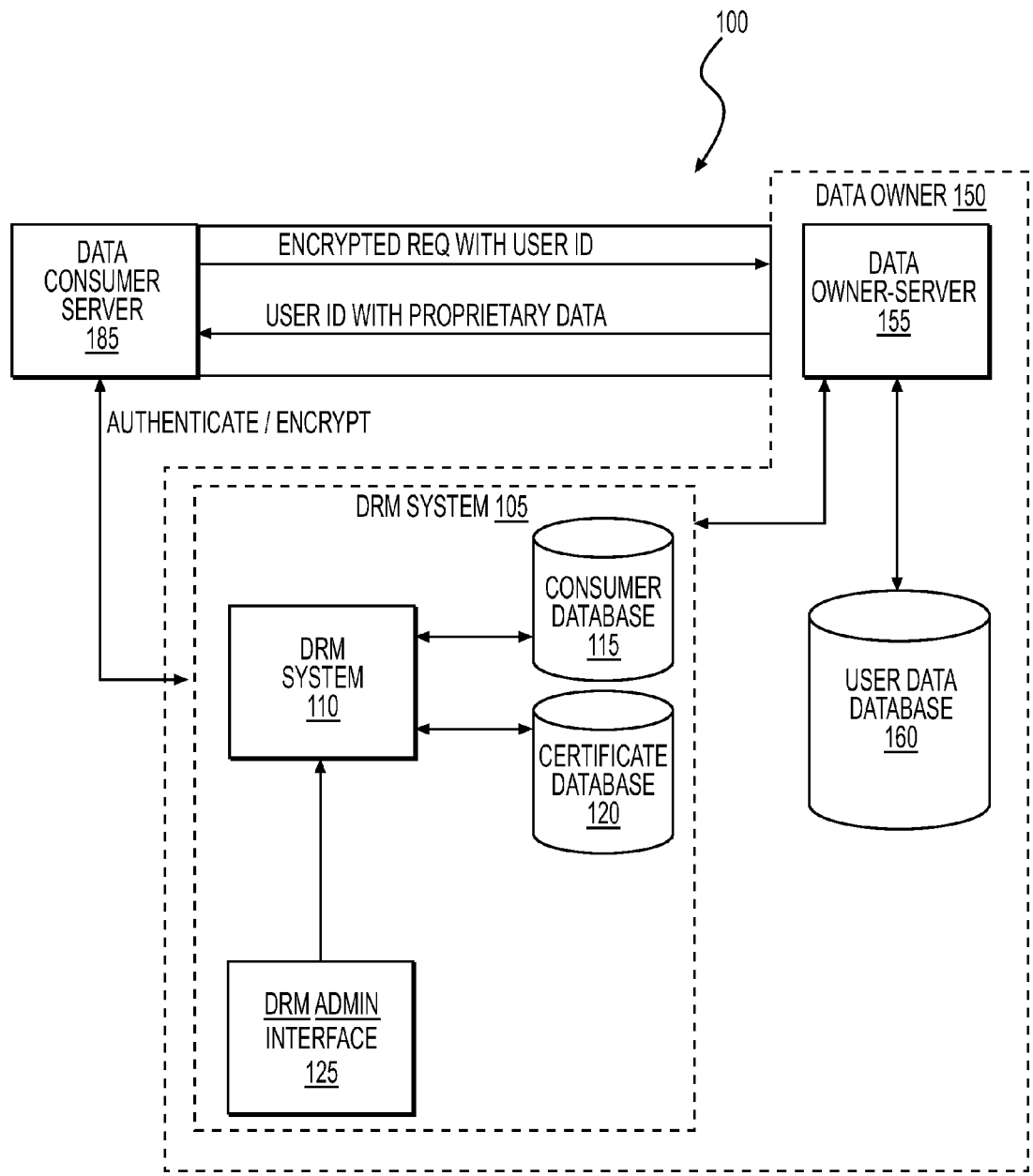

FIGS. 1A and 1B depict an online advertising data management system 100, according to an embodiment. A shown in FIG. 1A, the online advertising data management system 100 may generally include a digital rights management ("DRM") system 105, a data owner system 150, and a data consumer system 180. The data consumer system 180 may submit authentication and/or encryption registration requests to DRM system 105. Upon authentication, the DRM system may then return a digital certificate to the data consumer system 180. The data consumer system 180 may then submit encrypted requests for proprietary data to data owner system 150. The data owner system 150 may then process and/or encrypt the proprietary data, and then transmit the encrypted proprietary data to the data consumer system 180.

FIG. 1B shows a more detailed embodiment of an online advertising data management system 100, according to one embodiment. As shown in FIG. 1B, the DRM system 105 may include a DRM server 110, a consumer database 115, a certificate database 120, and a DRM administration interface 125. The DRM server 110 may provide data consumers with digital certificates for securely accessing proprietary data, such as online advertising data, of data owners. The DRM server 110 may act as a clearinghouse for one or more data owner systems 150. The DRM system 105 may be a separate system, as shown in FIG. 1A, or the DRM system 105 may be a system controlled by data consumer system 150, as shown in FIG. 1B.

The DRM system 105 may provide a web-based and/or application-based DRM encryption that enables a data consumer system 180 to encrypt requests and decrypt responses. DRM system 105 may also allow data owner system 150 to decrypt requests from the data consumer system 180, and encrypt and/or package (e.g., encrypt, associate digital rights, and/or set data consumer privileges) the proprietary data of the data owner. The proprietary data may include unformatted text, formatted text, audio, video, and/or images associated with one or more users. The encrypted and/or packaged proprietary data may be transmitted to the data consumer by the data owner system 150 and/or the DRM system 105. Additionally, the encrypted proprietary data may also be downloadable as one or more files and/or streamed to the data consumer from the data owner system 150 and/or the DRM system 105.

The DRM system 105 may control and monitor a web-based and/or an application based encryption and/or decryption process, and may handle certificate generation and/or issuance of the certificates. Certificate handling may include delivering keys used by the data consumer system 180 to access the encrypted and/or packaged proprietary data and may include tracking the distribution of the encrypted and/or packaged proprietary data.

The DRM system 105 may include a certificate database 120 for storing certificate-related information. The certificate-related information may include key IDs, certificate seed keys, rights, privileges and conditions of certificates, and/or other attributes relating to the certificates. As mentioned above, the DRM system 105 may also include a DRM administration interface 125, which may be a web-based interface and/or application-based interface that allows for certificate management and/or controlling of encryption and/or decryption of the proprietary data. The DRM server 110 may be accessed through the DRM administration interface 125, via a web-based interface and/or an application, and may provide an ability to package the proprietary data and/or manage the rights and/or privileges associated with the proprietary data.

The DRM system 105 may include a consumer/owner database 115 for storing authentication/registration information of data owners and data consumers. The consumer/owner database 115 may also be associated with the certificate-related information in the certificate database 120 for the respective data owner and data consumer.

The data owner system 150 may include a data owner server 155 and a proprietary data database 160 that may be used to store unencrypted and unpackaged proprietary data. The data owner server 155 may be used to host encrypted and/or packaged proprietary data, which is encrypted and packaged by DRM system 105 or data owner system 150, or may be used to encrypt and/or package proprietary data by using the certificate-related information provided by DRM service 105.

A data consumer system 180 may include a data consumer server 185. The data consumer server 185 may include a web-based interface and/or an application for accessing DRM system 105. The web-based interface and/or application may allow a data consumer to use the DRM system 105 via the DRM administration interface 125 and/or the one or more data owner systems 150.

As mentioned above, the data owner server 155 may use an application to encrypt and package the proprietary data locally from the certificate-related information provided by DRM system 105. Software may be installed on the data owner server 155 to enable the encryption. The software may include code to encrypt and/or package the proprietary data on data owner server 155 and/or include code that calls and runs a web-based encryption and packager hosted by DRM server 110. The web-based interface and/or application may encrypt the proprietary data and/or package the proprietary data.

Figure 2:
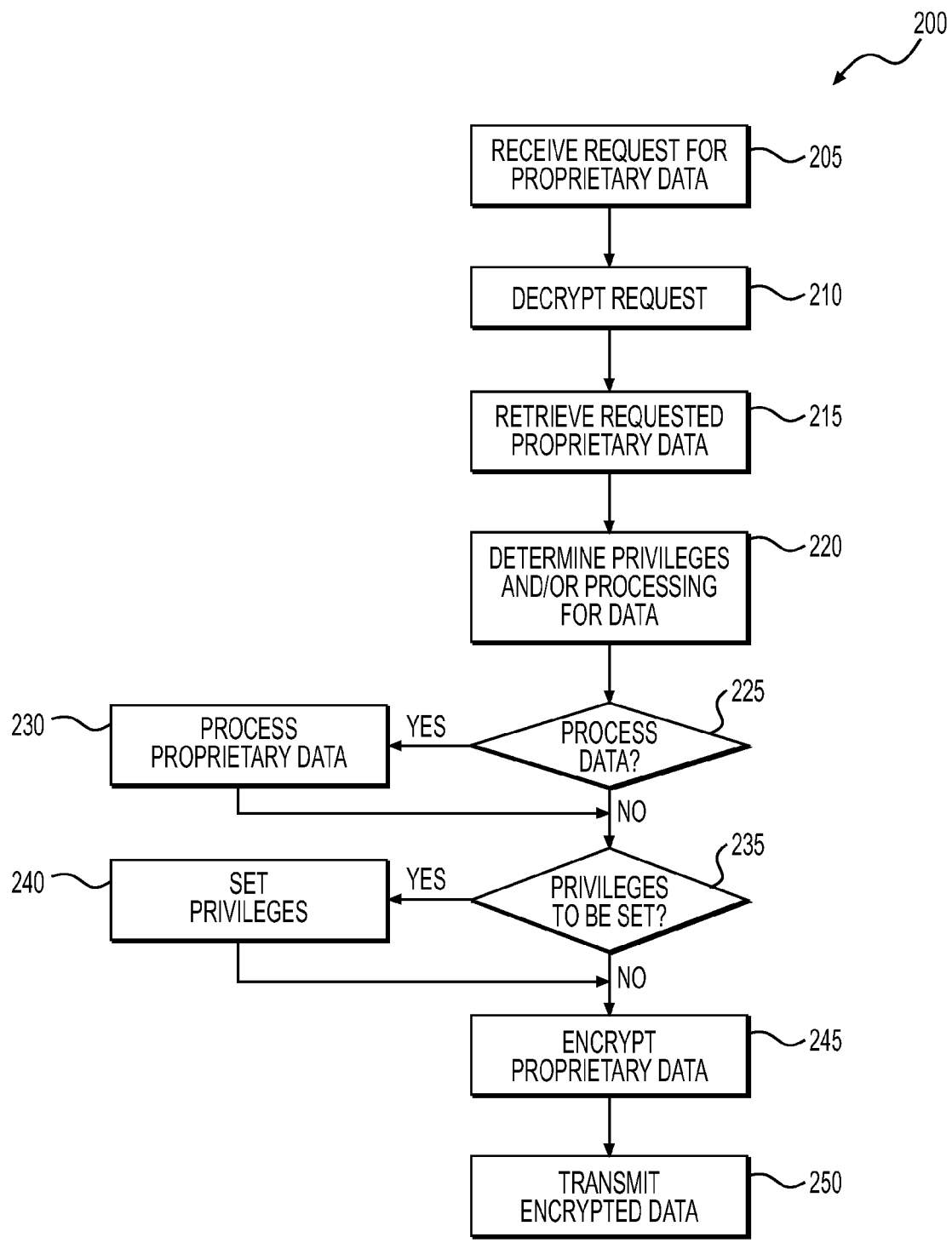
FIG. 2 is a flow diagram of a method in which data owners may share proprietary data with data consumers using a DRM system according to embodiments of the present disclosure.

FIG. 2 is a flowchart describing management of online advertisement data sharing through an encryption and/or packaging process 200 according to an embodiment. As shown in the flowchart, a data owner using data owner system 150 may receive a request for proprietary data at step 205, e.g., from data consumer system 180. The request may be encrypted and may include a data consumer identifier ("ID"). The data consumer ID may be provided to the DRM system 105 to identify the data consumer making the request by accessing the consumer/owner database 115 of DRM system 105. The DRM system 105 may be used by the data owner system 150 to identify the data consumer ID via a request for a web-based- and/or application-based DRM decryption. The DRM system 105 may send the information to the data owner system 150, along with certificated-related information stored in the certificates database 115 to allow decryption of the request and/or encryption of the proprietary data.

At step 210, the request may be decrypted by the data owner system 150 using a web-based call to DRM system 105 and/or through an application on data owner server 155. Upon decryption, the proprietary data that has been requested may be retrieved from proprietary user data database 160 at step 215. At step 220, the data owner system 150 may determine the privileges to be set and/or processing to be done on the proprietary data based on the request received.

At step 225, the data owner system 150 may determine if the proprietary data is to be processed. If the proprietary data to be sent to the data consumer is not to be processed, method 200 may proceed to step 235. If the proprietary data is to be process, method 200 may proceed to step 230, where the data owner server 155 processes the proprietary data. Processing the proprietary data may include producing aggregated proprietary data, removing user-identifiable information, and/or processing the proprietary data into non-raw proprietary data. After processing, method 200 may proceed to step 235. During the processing operation, the data owner system 150 may transmit corresponding status information (e.g., starting, percent complete, finishing) to the data consumer system 180 until processing is complete. When all of the processing of the proprietary online advertising data is complete the processed proprietary data may be stored in a database (not shown) of the data owner system 150.

After the proprietary data has been processed or the data is not to be processed, the data owner system 150 may determine whether privileges are to be set for the proprietary data. If the proprietary data to be sent to the data consumer is not to have privileges set, method 200 may proceed to step 245. If the proprietary data is to have privileges set, method 200 may proceed to step 240, where the data owner server 155 may set the privileges for the proprietary data. The privilege rights may define restrictions on how the proprietary data may be used. For example, the privilege rights may be set to one or more of: restricting access time to the proprietary data; restricting the proprietary data type/format; restricting the proprietary data to view only; and/or revoking access to the data under predefined conditions. After setting privileges, method 200 may proceed to step 245.

At step 245, the data owner system 150 and/or the DRM 105 may encrypt the proprietary data. After the proprietary data is encrypted, the encrypted proprietary data may be transmitted to the data consumer system 180.

The above-described system and method may support pre-delivery and/or post-delivery of certificates. For pre-delivery, the certificate may be delivered just before the request for proprietary data is sent. When the data consumer system 180 requests proprietary data, the data owner system 150 may have the certificate-related information from DRM system 105, and/or perform a check with DRM system 105 to ensure that the certificate is still current.

Any of DRM server 110, data owner server 155, and/or data consumer server 185 may include any type or combination of computing systems, such as handheld devices, personal computers, servers, clustered computing machines, and/or cloud computing systems. In one embodiment, DRM server 110, data owner server 155, and/or data consumer server 185 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 3:
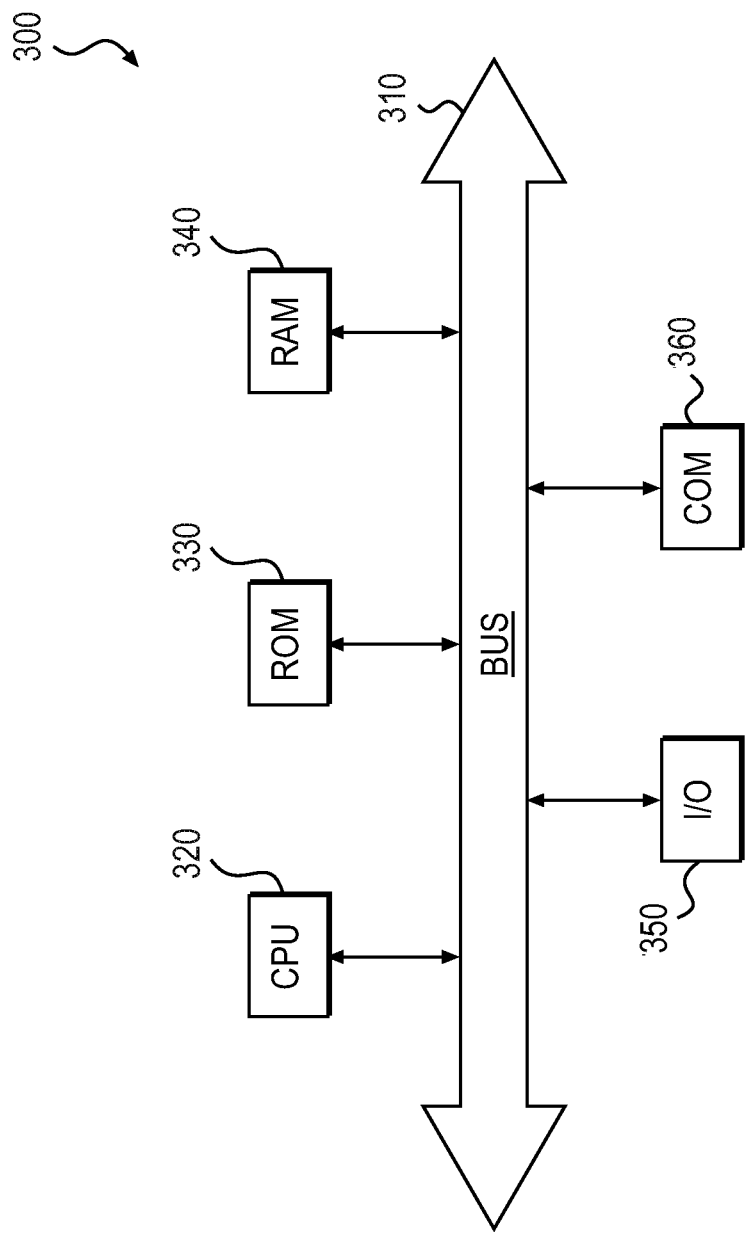
FIG. 3 is a simplified functional block diagram of a computer that may be configured as a device or server for executing the method of FIG. 2, according to exemplary embodiments of the present disclosure.

FIG. 3 is a simplified functional block diagram of a computer that may be configured as a client, agent, or server for executing the method of FIG. 2, according to exemplary an embodiment of the present disclosure. Specifically, in one embodiment, as shown in FIG. 3, any of DRM server 110, data owner server 155, and/or data consumer server 185 may be an assembly of hardware 300 including, for example, a data communication interface 360 for packet data communication. The platform may also include a central processing unit ("CPU") 320, in the form of one or more processors, for executing program instructions. The platform typically includes an internal communication bus 310, program storage, and data storage for various data files to be processed and/or communicated by the platform such as ROM 330 and RAM 340, although the system 300 often receives programming and data via network communications 370. The server 300 also may include input and output ports 350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing secure sharing of proprietary online user behavior data, the method including:
   receiving, at a server, a privilege associated with a data consumer, the privilege corresponding to an access level for the data consumer to the proprietary online user behavior data, the privilege including a data consumer identifier associated with the data consumer;
   receiving, at the server, a request for at least a portion of the proprietary online user behavior data from the data consumer, the request including the data consumer identifier;
   determining, by the server, whether the proprietary online user behavior data is at least one of: designated to be provided processed, designated to be provided unprocessed, and/or designated to have privileges set;
   upon determining that the proprietary online user behavior data is designated to be provided processed or designated to be provided unprocessed, retrieving, from a database of proprietary data, the proprietary online user behavior data based on the request;
   upon determining the proprietary online user behavior data is designated to be provided processed, removing user-identifiable information from the proprietary online user behavior data, and applying data aggregation processing to the proprietary online user behavior data to convert the proprietary online user behavior data to non-user-identifiable aggregated metadata;
   upon determining the proprietary online user behavior data is to be provided unprocessed, preparing to provide the proprietary online user behavior data unprocessed;
   upon determining the proprietary online user behavior data is designated to have privileges set, setting one or more privileges to the proprietary online user behavior data using a certificate associated with the data consumer identifier, the one or more privileges comprising a duration of data accessibility, and/or a data access revocation condition;
   encrypting the proprietary online user behavior data using the certificate associated with the data consumer identifier; and
   providing the encrypted proprietary online user behavior data to the data consumer.

2. The method of claim 1, wherein the data consumer is at least one of a data owner, a data broker, an Internet advertiser, reporting service, an impression bidder, and a data management platform service.

3. The method of claim 1, further comprising:
   receiving, from a digital rights management system, an authentication request, the authentication request requesting allowance to access the encrypted proprietary online user behavior data from the data consumer.

4. The method of claim 3, further comprising:
   determining, by the server, whether to allow access to the encrypted proprietary online user behavior data; and
   transmitting, to the digital rights management system, a result of the determination of whether to allow access to the encrypted proprietary online user behavior data.

5. The method of claim 1, further comprising:
   decrypting the request using the certificate associated with the data consumer identifier,
   wherein the retrieving, from the database of proprietary data, the proprietary online user behavior data is based on the decrypted request.

6. The method of claim 1, wherein the encrypting the proprietary online user behavior data using the certificate associated with the data consumer identifier includes:
- transmitting, to a digital rights management platform, the proprietary online user behavior data and the certificate associated with the data consumer identifier; and
- receiving, from the digital rights management platform, the encrypted proprietary online user behavior data.

7. A system for managing secure sharing of proprietary online user behavior data, the system including:
- a data storage device storing instructions; and
- a processor configured to execute the instructions to perform a method, the method including:
  - receiving, at a server, a privilege associated with a data consumer, the privilege corresponding to an access level for the data consumer to the proprietary online user behavior data, the privilege including a data consumer identifier associated with the data consumer;
  - receiving, at the server, a request for at least a portion of the proprietary online user behavior data from the data consumer, the request including the data consumer identifier;
  - determining, by the server, whether the proprietary online user behavior data is at least one of: designated to be provided processed, designated to be provided unprocessed, and/or designated to have privileges set;
  - upon determining that the proprietary online user behavior data is designated to be provided processed or designated to be provided unprocessed, retrieving, from a database of proprietary data, the proprietary online user behavior data based on the request;
  - upon determining the proprietary online user behavior data is designated to be provided processed, removing user-identifiable information from the proprietary online user behavior data, and applying data aggregation processing to the proprietary online user behavior data to convert the proprietary online user behavior data to non-user-identifiable aggregated metadata;
  - upon determining the proprietary online user behavior data is to be provided unprocessed, preparing to provide the proprietary online user behavior data unprocessed;
  - upon determining the proprietary online user behavior data is designated to have privileges set, setting one or more privileges to the proprietary online user behavior data using a certificate associated with the data consumer identifier, the one or more privileges comprising a duration of data accessibility, and/or a data access revocation condition;
  - encrypting the proprietary online user behavior data using the certificate associated with the data consumer identifier; and
  - providing the encrypted proprietary online user behavior data to the data consumer.

8. The system of claim 7, wherein the data consumer is at least one of a data owner, a data broker, an Internet advertiser, reporting service, an impression bidder, and a data management platform service.

9. The system of claim 7, wherein the processor is further configured to execute the instructions to perform the method further including:
- receiving, from a digital rights management system, an authentication request, the authentication request requesting allowance to access the encrypted proprietary online user behavior data from the data consumer.

10. The system of claim 9, wherein the processor is further configured to execute the instructions to perform the method further including:
- determining, by the server, whether to allow access to the encrypted proprietary online user behavior data; and
- transmitting, to the digital rights management system, a result of the determination of whether to allow access to the encrypted proprietary online user behavior data.

11. The system of claim 7, wherein the processor is further configured to execute the instructions to perform the method further including:
- decrypting the request using the certificate associated with the data consumer identifier,
- wherein the retrieving, from the database of proprietary data, the proprietary online user behavior data is based on the decrypted request.

12. The system of claim 7, wherein the encrypting the proprietary online user behavior data using the certificate associated with the data consumer identifier includes:
- transmitting, to a digital rights management platform, the proprietary online user behavior data and the certificate associated with the data consumer identifier; and
- receiving, from the digital rights management platform, the encrypted proprietary online user behavior data.

13. A non-transitory computer-readable medium storing instructions that, when executed by a computer, cause the computer to perform a method for managing secure sharing of proprietary online user behavior data, the method including:
- receiving, at a server, a privilege associated with a data consumer, the privilege corresponding to an access level for the data consumer to the proprietary online user behavior data, the privilege including a data consumer identifier associated with the data consumer;
- receiving, at the server, a request for at least a portion of the proprietary online user behavior data from the data consumer, the request including the data consumer identifier;
- determining, by the server, whether the proprietary online user behavior data is at least one of: designated to be provided processed, designated to be provided unprocessed, and/or designated to have privileges set;
- upon determining that the proprietary online user behavior data is designated to be provided processed or designated to be provided unprocessed, retrieving, from a database of proprietary data, the proprietary online user behavior data based on the request;
- upon determining the proprietary online user behavior data is designated to be provided processed, removing user-identifiable information from the proprietary online user behavior data, and applying data aggregation processing to the proprietary online user behavior data to convert the proprietary online user behavior data to non-user-identifiable aggregated metadata;
- upon determining the proprietary online user behavior data is to be provided unprocessed, preparing to provide the proprietary online user behavior data unprocessed;
- upon determining the proprietary online user behavior data is designated to have privileges set, setting one or more privileges to the proprietary online user behavior data using a certificate associated with the data consumer identifier, the one or more privileges comprising a duration of data accessibility, and/or a data access revocation condition;

encrypting the proprietary online user behavior data using the certificate associated with the data consumer identifier; and providing the encrypted proprietary online user behavior data to the data consumer.

14. The computer-readable medium of claim 13, wherein the data consumer is at least one of a data owner, a data broker, an Internet advertiser, reporting service, an impression bidder, and a data management platform service.

15. The computer-readable medium of claim 13, the method further comprising: receiving, from a digital rights management system, an authentication request, the authentication request requesting allowance to access the encrypted proprietary online user behavior data from the data consumer.

16. The computer-readable medium of claim 15, the method further comprising: determining, by the server, whether to allow access to the encrypted proprietary online user behavior data; and transmitting, to the digital rights management system, a result of the determination of whether to allow access to the encrypted proprietary online user behavior data.

17. The computer-readable medium of claim 13, the method further comprising: decrypting the request using the certificate associated with the data consumer identifier, wherein the retrieving, from the database of proprietary data, the proprietary data is based on the decrypted request.

* * * * *